United States Patent

[11] 3,540,606

| [72] | Inventor | Eric W. Johnson |
| | | 2431 Pointe Tremble Road, Algonac, Michigan 48001 |
| [21] | Appl. No. | 721,260 |
| [22] | Filed | April 15, 1968 |
| [45] | Patented | Nov. 17, 1970 |

[54] ROLLER AND RETRACTABLE PAD BUNK STRUCTURE
9 Claims, 6 Drawing Figs.

[52] U.S. Cl. .................................................. 214/84, 280/414
[51] Int. Cl. ...................................................... B60p 3/10
[50] Field of Search............................................. 214/84, 505, 506; 280/414; 254/43, 40, 29, 29.5; 248/Inq

[56] References Cited
UNITED STATES PATENTS

| 2,937,775 | 5/1960 | Funk ............................ | 214/505 |
| 3,455,472 | 7/1969 | Rankin ........................ | 214/84 |
| 3,104,770 | 9/1963 | Calkins et al. ............... | 214/84 |
| 3,120,317 | 2/1964 | Pardonnet .................... | 214/84X |
| 3,185,330 | 5/1965 | Buckner ....................... | 214/84X |
| 3,203,563 | 8/1965 | Blatchford .................... | 214/84 |
| 3,298,551 | 1/1967 | Thompson .................... | 214/84X |

Primary Examiner—Albert J. Makay
Attorney—Whittemore, Hulbert & Belknap

ABSTRACT: Bunk structure for use with boat trailers or the like including both roller assemblies and a retractable pad structure. The pad structure is pivotally supported and cam means is provided in the form of a pair of arcuate inclined planes engageable with the pivot support for the pad structure for camming the pad structure into and out of engagement with an object supported on the roller assemblies.

Means are also provided for maintaining the bunk structure at a predetermined angle with respect to the structure to which they are secured and for securing the bunk structure to a boat trailer or the like in different locations thereon with a minimum of difficulty.

Patented Nov. 17, 1970

INVENTOR
ERIC WM. JOHNSON

BY Whittemore,
Hulbert & Belknap

ATTORNEYS

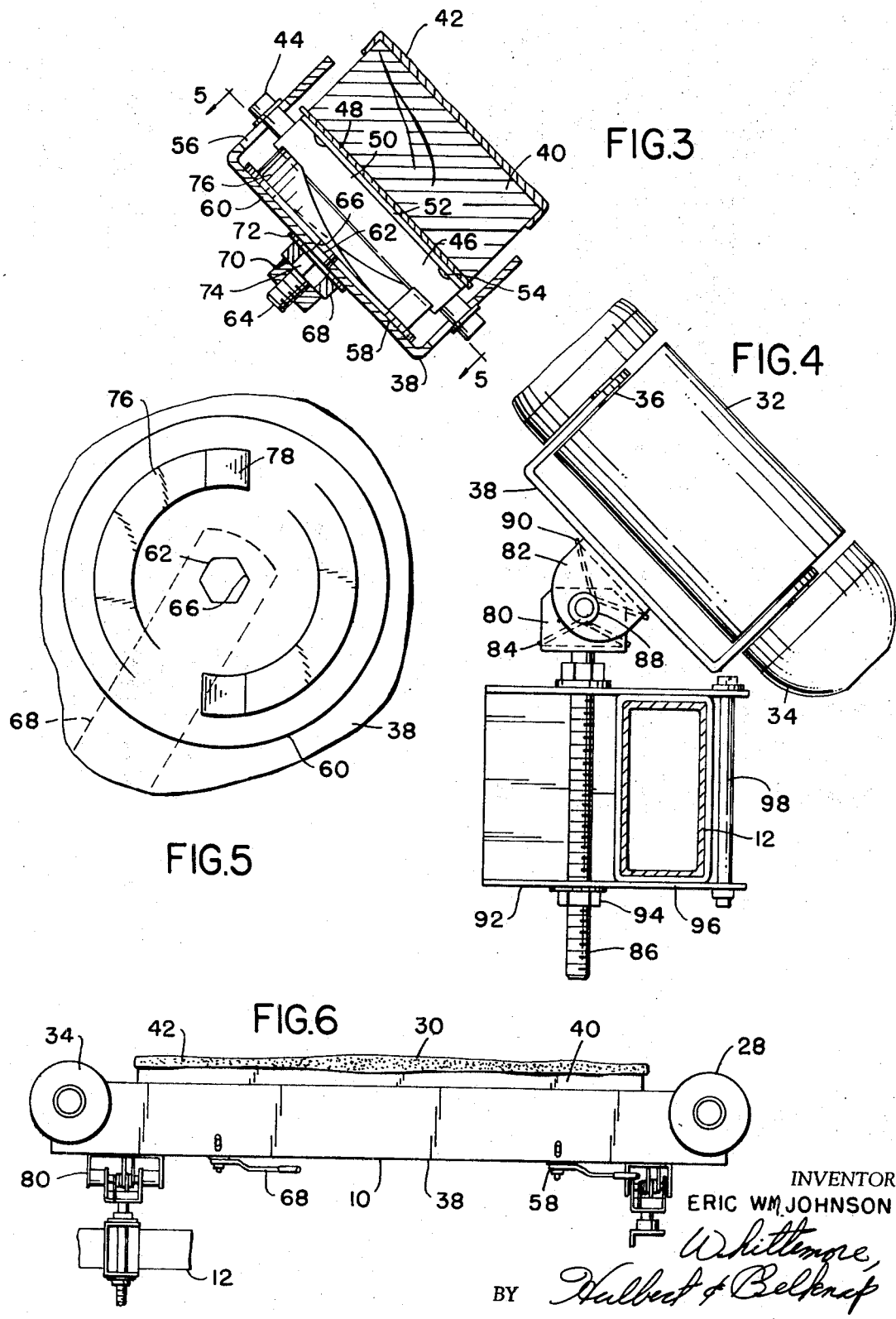

ROLLER AND RETRACTABLE PAD BUNK STRUCTURE

BACKGROUND OF THE INVENTION

1. Field of the Invention

The invention relates to bunk structure and refers more specifically to boat trailer bunks including both rollers and retractable pads which are simply, economically and efficiently cam operable and which bunk structures are maintained at predetermined angles relative to the trailer and may be secured to the trailer at selected locations by convenient means.

2. Description of the Prior Art

In the past bunk structures for boat trailers or the like have usually been either of the roller bunk type wherein a plurality of rotatably supported rollers have been positioned in spaced side-by-side relation engageable with the hull of a boat or the like moved thereover or have been of the pad-type wherein a pad of carpet or the like has been secured to a rigid member supported for engagement with a boat positioned on the boat trailer. The bunks of the past have not generally combined the rolling efficiency of roller bunks and the supporting efficiency of the pad bunks. A simple, economical and efficient cam actuated combination roller and retractable pad bunk has not been available in the past.

SUMMARY OF THE INVENTION

The invention comprises a boat bunk including separate roller assemblies for guiding a boat in movement onto and and off of a boat trailer or the like and retractable pad structure positioned relative to the roller assemblies and operable to steady the boat on the trailer without removing the boat from the roller assemblies. The pad structure of the bunk is pivotally mounted and is actuated by unique cam structure which is particularly simple, economical and efficient, including a pair of arcuate inclined planes extending for slightly less than 180° about a circle defined thereby in spaced-apart opposed relation.

In addition, structure is provided for supporting the boat bunk of the invention at a desired initial angle with respect to a boat trailer and permitting movement of the bunk with respect to the initial angle to conform to the hull of a boat supported on the trailer. There is also included structure for mounting the boat bunk on a boat trailer in different locations with equal facility and for limiting the required installation tolerances of the boat bunk in use.

BRIEF DESCRIPTION OF THE DRAWINGS

FIG. 3 is a section view of the bunk structure illustrated in FIG. 2 taken substantially on the line 3—3 in FIG. 2.

FIG. 4 is a broken end view of the bunk structure illustrated in FIG. 2 taken in the direction of arrow 4 in FIG. 2.

FIG. 5 is an enlarged partial section view of the bunk structure of FIG. 3 taken substantially on the line 5—5 in FIG. 3.

FIG. 6 is a side elevation view of modified bunk structure constructed in accordance with the invention.

DESCRIPTION OF THE PREFERRED EMBODIMENT

Figure 1:
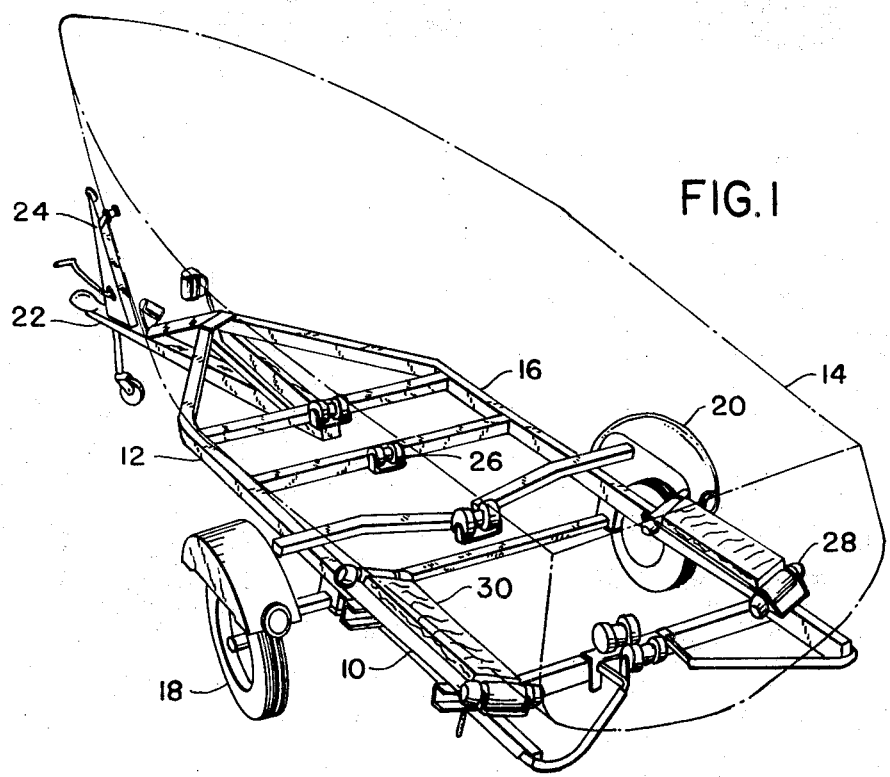
FIG. 1 is a perspective view of a boat trailer including bunk structure constructed in accordance with the invention secured thereto and showing a boat supported thereon in phantom.

As shown in FIG. 1, the combination roller, retractable pad, bunk 10 is mounted on the boat trailer 12. A boat 14 is shown in phantom positioned on the trailer 12 and in engagement with the bunk 10.

The trailer 12 includes the usual frame 16, wheels 18 and fenders 20. Structure 22 for securing the boat trailer 12 to an automobile or the like is provided at the forward end of the trailer along with a bow roller and launching jack 24. Additional rollers 26 are provided for the keel of the boat 14 spaced longitudinally of the trailer 12.

The bunks 10 are located at the rear of the trailer 12 and include roller assemblies 28 at both ends thereof and the retractable pad assembly 30 positioned between the roller assemblies 28. In use, the roller assemblies 28 support the boat 14, particularly during movement of the boat 14 onto and off of the trailer 12. The pad structure 30 steadies the boat 14 in position on the trailer 12.

Figure 2:
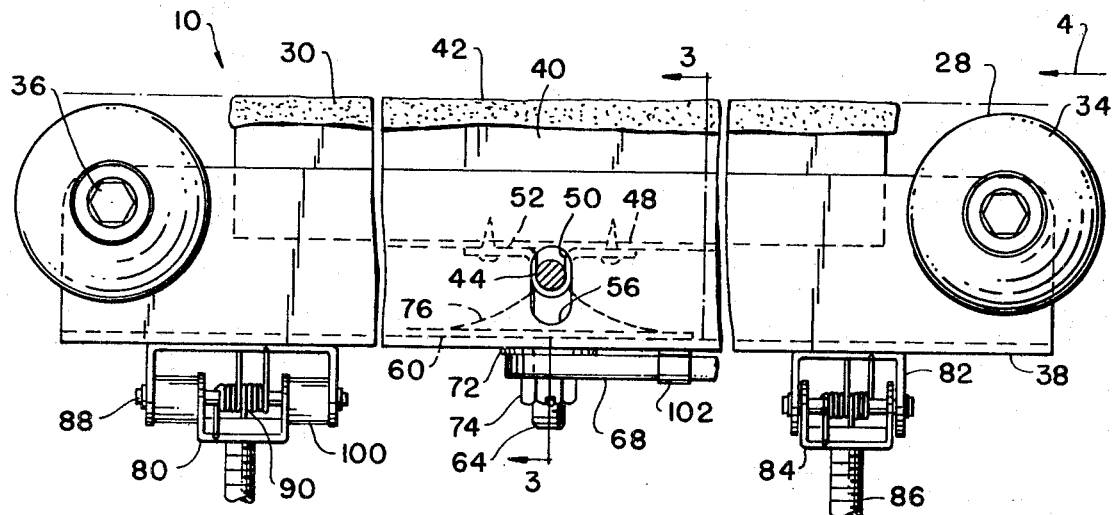
FIG. 2 is an enlarged broken elevation view of the bunk structure illustrated in FIG. 1.

Roller assemblies 28, as best shown in FIGS. 2 and 4, each include a cylindrical middle portion 32 and ball ends 34 secured to a roller shaft 36. The shaft 36 is mounted for rotation in the elongated channel member 38. The cylindrical middle portion 32 and the ball end portions 34 of the roller assemblies 28 may be hard rubber or other suitable resilient material.

Pad structure 30, as shown best in FIGS. 2 and 3, includes an elongated rigid member 40 having a soft pad 42 secured thereto, as by nailing or the like. The rigid member 40 may be wood, as shown, and the pad 42 may be carpet material.

Rigid member 40 is centrally pivotally mounted on the roller shaft 44. Bearing member 46 which includes a flat plate portion 48 and a half-cylindrical portion 50 having flanges 52 at each side thereof in surface-to-surface engagement with the plate 48 is secured to the rigid member 40 of the pad 30 by convenient means, such as screws 54, with the cylindrical portion 50 extending transversely of the pad 30 and receiving the roller shaft 44 therein.

The roller shaft 44 is mounted in slots 56 positioned centrally of the channel member 38, whereby the pad structure 30 is movable transversely of the rollers into a position in which the pad 42 engages an object supported on the roller assemblies 28 from an initial position in which the pad structure 30 is retracted into the channel 38 out of engagement with any object extending between the roller assemblies 28.

In accordance with the invention cam means 58 are provided for moving the pad structure 30 into an object engaging position. The cam means 58 includes a circular disc 60 mounted on the head 62 of a threaded stud 64. The head 62 of the stud 64 is noncircular and is of the same configuration as the opening 66 in the disc 60 which receives it and is secured thereto by welding or the like. Thus, the stud 64 is positively fixed against rotation relative to the disc 60.

An elongated handle 68 is positioned over the noncircular center portion 70 of the stud 64 and is secured thereto between the washer 72 and the nut 74. Thus, on pivoting the handle 68 about the longitudinal axis of the stud 64, the disc 60 is rotated about the center thereof.

A pair of spaced-apart opposed inclined planes 76, shown best in FIG. 5, are secured to the disc 60, as by welding. The inclined planes 76 define a circle on the disc 60 and each have an extent slightly less than 180°, whereby the cylindrical portion 50 of the bearing member 46 secured to the pad structure 30 may rest on the disc 60 between the inclined planes when the handle 68 is rotated to extend perpendicularly of the pad structure 30.

The inclined planes 76 have at their upper ends concave portions 78. The concave portions 78 at the upper ends of the inclined planes 76 receive the cylindrical portion 50 of the bearing member 46 when the handle 68 is rotated to extend longitudinally of the pad structure 30 with the pad structure 30 in engagement with a boat 14 resting on the roller assemblies 28.

Structure 80 is provided for maintaining the bunk 10 at an initial predetermined angle with the bunk installed on a trailer 12. The structure 80 includes a pair of U-shaped brackets 82 and 84 at each end of the channel 38. The brackets 82 are secured to the channels by convenient means, such as welding, while the brackets 84 are secured to an elongated mounting bolt 86. As shown, brackets 84 are received within brackets 82 and a pivot pin 88 extends therethrough to pivotally connect the brackets 82 and 84 together. The springs 90 on pivot pin 88 engage the brackets 82 and 84 to resiliently maintain the channel 38 at a predetermined angle with respect to the mounting bolt 86. With such structure it will be seen that the bunk 10 is permitted to vary in angle on the trailer 12, whereby the roller assemblies 28 and the pad structure 30 will engage boat hulls having different configurations.

Mounting bolt 86, as shown best in FIG. 4, extends through the channel 92 and is secured thereto by convenient means, such as nuts 94. Channel 92 is connected as by welding to the C-shaped bracket 96 and the C-shaped bracket 96 is mounted on the frame 12 of the trailer by the bolt 98. Thus, the bunk 10 may be mounted on the trailer 12 in a plurality of convenient locations.

Further, due to the fact that the bracket 82 at one end of the bunk 10 is considerably larger than the bracket 84 in the longitudinal dimension of the bunk 10, it will be readily understood that exact positioning of the C-clamps 96 is not required, whereby installation of the bunks 10 is facilitated. Thus, in installation, the right-hand bracket illustrated in FIG. 2 are first secured together by means of the pivot pin 88 after the C-clamps 96 have been installed in an approximate relation to each other on the trailer 12. Spacers 100 are then provided between the left-hand brackets 82 and 84, as required, by the particular dimension between the C-clamps 96 at the opposite ends of the bunk 10 and the pivot pin 88 positioned to secure the brackets at the left in FIG. 2 together to complete the assembly.

Thus, in overall operation of the boat trailer 14 having bunks 10 thereon, for example, in placing a boat on the trailer, the handles 68 are first positioned perpendicular to the bunks 10 so that the pad structures 30 are retracted into the channels 38. The boat 14 is then mounted on the trailer 12 by means of the bow roller and launching jack, the rollers 26 and the roller assemblies 28 in engagement with the boat hull. The bunks 10 will change angle at this time by pivoting about the pivot pins 88, as will be understood by those in the art, to firmly engage the roller assemblies 28 with the hull of the boat 14.

With the boat 14 in position on the trailer 12, as shown in FIG. 1, the handles 68 of the bunk 10 are positioned in alignment with the longitudinal extent of the bunk 10, whereby the discs 60 are rotated to cam the bearing member 46 and pad assemblies 30 up the inclined planes 76 and into the concave portions 78. At this time the handles 68 will be secured in place by the spring clip 102 and the pad structures 30 will be in engagement with the hull of the boat 14 to steady the boat 14 in transit.

To remove the boat 14 from the trailer 12, a reverse procedure is accomplished. Thus, initially the handles 68 are rotated into a position perpendicular to the bunks 10, whereby the bearing structures 46 are cammed down the inclined planes 76 and are positioned in engagement with the disc 60. At this time the pad structure 30 is out of engagement with the hull of the boat 14, which then rests on the roller assemblies 28 for ready removal from the trailer 12.

While one embodiment of the present invention has been disclosed in detail, it will be understood that other embodiments and modifications are contemplated. Thus, as shown in FIG. 6, with longer bunk structures, camming means may be provided at both ends of the pad structure. It is the intention to include all embodiments and modifications as are defined by the appended claims within the scope of the invention.

I claim:

1. A bunk for a boat trailer or the like comprising at least one roller assembly for supporting an object movable thereover in contact therewith, pad structure positioned adjacent the roller including a pivot mounting comprising a pivot shaft extending transversely of the pad structure and an elongated metal bearing member secured to the pad structure and extending around the pivot shaft and cam means engaged with the pivot mounting for moving the pad structure relative to the roller assembly into and out of engagement with an object supported by the roller assembly for steadying the object which cam means comprises a plate having a pair of arcuate, spaced-apart, inclined planes thereon each extending over less than 180° of a circle defined thereby to receive the bearing member therebetween and handle means connected to the plate for rotating the plate.

2. Structure as set forth in claim 1 wherein the means for rotating the plate includes a handle secured to the plate by a noncircular bolt extending through the handle and plate whereby relative rotational movement between the handle and plate is prevented.

3. Structure as set forth in claim 2 wherein the handle means is oriented with respect to the inclined planes to be positioned parallel to the pad structure with the pad structure cammed into an upper position with respect to the roller assemblies.

4. Structure as set forth in claim 1 wherein a plurality of cam means and pivot mountings are provided to support the pad structure at predetermined points longitudinally thereof and roller assemblies are provided at both ends of the pad structure.

5. Structure as set forth in claim 1 and further including means for supporting the bunk at a predetermined angle comprising at least one U-shaped bracket secured to the bunk having legs extending outwardly from the bunk, a second U-shaped bracket having legs thereon extending toward the bunk, pivot means extending between the legs of the brackets and spring means operable between the brackets to maintain the brackets in a predetermined relative position.

6. Structure as set forth in claim 5, wherein at least two sets of brackets are provided at spaced-apart locations along the bunk and the U-shaped brackets of at least one set have substantially different dimensions between the legs thereof.

7. Structure as set forth in claim 5 and further including a mounting bolt secured to the second bracket, a C-clamp and means securing the mounting bolt to the C-clamp.

8. A bunk for a boat trailer or the like comprising at least one roller assembly for supporting an object movable thereover in contact therewith, pad structure positioned adjacent the roller which pad structure includes a pivot mounting including a pivot shaft extending transversely of the pad structure and an elongated metal bearing member secured to the pad structure and extending around the pivot shaft, rotatably mounted arcuate inclined plane cam means engaged with the pivot mounting for moving the pad structure relative to the roller into and out of engagement with an object supported by the roller for steadying the object and means secured to the arcuate inclined plane cam means for rotating the arcuate inclined plane cam means.

9. A boat trailer including a frame and at least one bunk and means for flexibly supporting the bunk on the frame at a predetermined angle relative to the frame including at least two sets of brackets in spaced-apart location along the bunk each of which sets of brackets includes one U-shaped bracket secured to the bunk having legs extending outwardly from the bunk toward the frame, a second U-shaped bracket secured to the frame having legs thereon extending toward the bunk, the U-shaped brackets of at least one set of brackets having substantially different dimensions between the legs thereof so that exact location of the brackets on the frame and bunk longitudinally of the bunk is not required and pivot means extending between the legs of the brackets.